US011898456B2

(12) United States Patent
Calderon et al.

(10) Patent No.: US 11,898,456 B2
(45) Date of Patent: Feb. 13, 2024

(54) GAS TURBINE ENGINE

(71) Applicants: ROLLS-ROYCE plc, London (GB);
ROLLS-ROYCE DEUTSCHLAND LTD & CO KG, Dahlewitz (DE)

(72) Inventors: Jorge Calderon, Derby (GB); David Brown, Derby (GB)

(73) Assignees: ROLLS-ROYCE plc, London (GB);
ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 0 days.

(21) Appl. No.: 17/742,620

(22) Filed: May 12, 2022

(65) Prior Publication Data
US 2022/0275763 A1    Sep. 1, 2022

Related U.S. Application Data

(63) Continuation of application No. 17/029,173, filed on Sep. 23, 2020, now abandoned.

(30) Foreign Application Priority Data

Sep. 30, 2019    (GB) ..................................... 1914042

(51) Int. Cl.
*F01D 21/04* (2006.01)
*F01D 25/16* (2006.01)
(Continued)

(52) U.S. Cl.
CPC ............. *F01D 21/04* (2013.01); *F01D 17/06* (2013.01); *F01D 21/003* (2013.01);
(Continued)

(58) Field of Classification Search
CPC ........ F01D 21/04; F01D 21/003; F01D 21/06; F01D 25/162; F01D 25/168; F01D 17/06; F02C 9/26
See application file for complete search history.

(56) References Cited

U.S. PATENT DOCUMENTS 8,869,504 B1    10/2014    Schwarz et al.
2012/0210694 A1*    8/2012    Holmquist .............. G01L 3/109
                                                                            415/118

(Continued)

FOREIGN PATENT DOCUMENTS

EP    2048330 A2    4/2009
EP    2884056 A1    6/2015
(Continued)

OTHER PUBLICATIONS

Nov. 27, 2020 Extended Search Report issued in European Patent Application No. 20193783.6.
(Continued)

*Primary Examiner* — Andrew H Nguyen
(74) *Attorney, Agent, or Firm* — Oliff PLC

(57) ABSTRACT

A gas turbine engine for an aircraft. The engine including: an engine core with a turbine, a compressor, a fan located upstream of the compressor and including a plurality of fan blades, and a core shaft connecting the turbine to the compressor; a gearbox which receives an input from the core shaft and outputs drive, via a driveshaft, to the fan so as to drive the fan at a lower rotational speed than the turbine, the drive shaft and core shaft forming a shaft system.

7 Claims, 14 Drawing Sheets

(51) Int. Cl.
*F02C 9/26* (2006.01)
*F01D 17/06* (2006.01)
*F01D 21/00* (2006.01)
F02C 9/46 (2006.01)
F04D 29/051 (2006.01)

(52) U.S. Cl.
CPC ......... *F01D 25/162* (2013.01); *F01D 25/168* (2013.01); *F02C 9/26* (2013.01); *F02C 9/46* (2013.01); *F04D 29/051* (2013.01); *F05D 2270/021* (2013.01); *F05D 2270/304* (2013.01)

(56) References Cited

U.S. PATENT DOCUMENTS

| | | |
|---|---|---|
| 2013/0058775 A1 | 3/2013 | Simms |
| 2013/0098042 A1 | 4/2013 | Frealle et al. |
| 2014/0241852 A1 | 8/2014 | Fuller et al. |
| 2017/0159486 A1* | 6/2017 | Chepel .................. F01D 21/20 |
| 2018/0291755 A1 | 10/2018 | Valva et al. |
| 2018/0363665 A1 | 12/2018 | Sheridan et al. |

FOREIGN PATENT DOCUMENTS

| | | |
|---|---|---|
| EP | 3040520 A1 | 7/2016 |
| EP | 3161270 A1 | 5/2017 |
| EP | 3296540 A1 | 3/2018 |
| GB | 2468686 A | 9/2010 |

OTHER PUBLICATIONS

Combined Search and Examination Report of the Intellectual Property Office of the United Kingdom for GB1914042.5 with report date of Feb. 26, 2022 and search date of Feb. 25, 2020.

* cited by examiner

GAS TURBINE ENGINE

CROSS-REFERENCE TO RELATED APPLICATIONS

This is a Continuation of U.S. patent application Ser. No. 17/029,173 filed Sep. 23, 2020, which in turn claims priority to British Patent Application No. 1914042.5 filed Sep. 30, 2019. The entire disclosures of the prior applications are hereby incorporated by reference herein their entirety.

BACKGROUND

Field of the Disclosure

The present disclosure relates to a gas turbine engine, and particularly a gas turbine engine for use in an aircraft.

Background of the Related Art

Modern gas turbine engines typically have up to three compressor-turbine groups, also referred to as spools, connected by respective concentric shafts. These compressor-turbine groups are responsible for the compression and expansion of air passing through the engine.

For example, the Rolls-Royce Trent 1000 aerospace gas turbine engine has three compressor-turbine groups: the low pressure compressor-turbine group, the intermediate pressure compressor-turbine group, and the high pressure compressor-turbine group. Each of these has a corresponding compressor and turbine. In the case of the low pressure compressor-turbine group, the low pressure compressor is typically referred to as the fan. The mechanical linkages extending from the turbine to the compressor is commonly referred to as the torque path, i.e. the path along which torque is transmitted.

It is possible, during operation of the gas turbine engine, for a shaft connecting a compressor and turbine pair to fail. This breakage in the shaft leads to an instantaneous decoupling between the turbine and its respective compressor. As a result the compressor may decelerate rapidly, as it is no longer being driven by the turbine, and the turbine may accelerate rapidly, as it no longer driving the compressor.

The rapid acceleration of the turbine is particularly concerning, as over-speed events can lead to disintegration of the turbine, including possibly bursting of the turbine disc, and further damage to the gas turbine engine.

It is important then to rapidly recognize a shaft break within a gas turbine engine, so that the appropriate action can be taken. Previously shaft failure detection systems can have detection time periods in the range of 20-30 ms. During this period, the turbine can accelerate in an unmanaged manner towards its terminal speed i.e. the maximum speed reached prior to the turbine decelerating.

SUMMARY

According to a first aspect there is provided gas turbine engine for an aircraft comprising:
an engine core comprising a turbine, a compressor, a fan located upstream of the compressor and comprising a plurality of fan blades, and a core shaft connecting the turbine to the compressor;
a gearbox which receives an input from the core shaft and outputs drive, via a driveshaft, to the fan so as to drive the fan at a lower rotational speed than the turbine, the drive shaft and core shaft forming a shaft system, wherein the shaft system provides:
a first portion which extends forward from a first thrust bearing to the fan, the first thrust bearing supporting the shaft system and being located between the turbine and the gearbox, and
a second portion extending rearward from the first thrust bearing to the turbine,
such that in the event of a shaft break within the second portion of the shaft system, said shaft break dividing the shaft system into a front portion axially located by the first thrust bearing and a rear portion no longer axially located by the first thrust bearing, the rear portion is free to move axially rearwardly under a gas load; and
wherein the engine further comprises a shaft break detector, configured to detect a shaft break in the shaft system.

Advantageously, the entire core shaft is protected with respect to shaft break. Therefore, the terminal speed of the turbine in such a gas turbine engine is reduced as any failure in the shaft system will be quickly detected.

Further, as any fault in the second portion of the shaft system will be axially unlocated, the rear portion can move axially rearwardly under a gas load. The turbine connected to this rear portion will inherently have a lower terminal speed due to friction (e.g. clashing or tangling between the turbine blades and any stationary features of the gas turbine engine) and a loss of turbine efficiency (as it moves relative to any guide vanes and blade tip seals).

Here, torque path may refer to the mechanical linkages which connect the turbine to the fan i.e. the mechanical path along which torque is transmitted from the turbine to the fan.

The gas turbine may have any, or any combination insofar as they are compatible, of the optional features set out herein.

The core shaft may be supported by one or more non-thrust bearings located rearwards of the first thrust bearing.

The first thrust bearing may be located such that the pathway for torque transmission from the turbine to the compressor includes the first portion of the shaft system. Beneficially, locating the first thrust bearing thusly causes the compressor's inertia and aerodynamic resistance to be located in the first portion of the core shaft. This reduces the maximum terminal speed of the turbine, plus any components of the engine connected to the turbine.

The drive shaft may be supported forward of the first thrust bearing by one or more further thrust bearings. The first thrust bearing and a further thrust bearing may be mechanically coupled in that one raceway of the further thrust bearing is rotationally locked relative to a radially opposite raceway of the first thrust bearing. For example, the radially outer raceway of the further thrust bearing may be rotationally locked relative to the radially inner raceway of the first thrust bearing, or vice versa.

The core shaft may include a shaft spline which connects a portion of the core shaft driven by the turbine to a portion of the core shaft driving the gearbox. The shaft spline may be located in the first portion. As any failures in the shaft spline will be axially located, due to the setup of the gearbox, this ensures that the second portion can only incur an axially unlocated failure.

The shaft break detector may include a pair of phonic wheels spaced axially along the shaft system, each configured to sense a rotational speed of a respective portion of the shaft system. The shaft break detector may be configured to register a shaft break when it detects that a difference in the speed measured by the pair of phonic wheels exceeds a threshold. The shaft break detector may include a pair of microwave sensors, configured to sense respective rotational speeds of axially spaced portions of the shaft system.

The shaft break detector may include a phonic wheel, located at a first portion of the shaft system, and a microwave sensor, configured to sense a rotational speed of the shaft system at a second portion of the shaft system axially spaced form the first portion. The microwave sensor may be configured to sense a rotational speed of the turbine stage which is distalmost to a point where a drive arm of the turbine connects to the core shaft. In one example, this distalmost turbine stage may be the closest to the fan. In another example, this distalmost turbine stage may be the furthest from the fan.

The gas turbine engine may further comprise a roller bearing supporting the drive shaft.

The shaft break detector may be configured to register a shaft break when it detects a twist exceeding a predetermined threshold between two points in the first portion of the shaft system.

The gas turbine engine may further comprise an axial movement sensor, configured to register a shaft break when it detects rearward axial movement of the rear portion of the shaft system in the event of a shaft break within the second portion of the shaft system.

The gas turbine engine may further include a sealed cavity located rearward of the first thrust bearing, wherein the sealed cavity, during operation of the gas turbine engine, is pressurized to a pressure exceeding that of a cavity containing the first thrust bearings, such that an axially forward force is applied to the core shaft.

The turbine may be a first turbine, the compressor may be a first compressor, and the core shaft may be a first core shaft; the engine core further comprises a second turbine, a second compressor, and a second core shaft connecting the second turbine to the second compressor; the second turbine, second compressor, and second core shaft are arranged to rotate at a higher rotational speed than the first core shaft; and wherein the second core shaft is axially located by one or more respective thrust bearings.

The first thrust bearing of the first core shaft and a thrust bearing of the second core shaft may be mechanically coupled in that a radially outer raceway of the second core shaft thrust bearing is rotationally locked relative to a radially inner raceway of the first thrust bearing.

Advantageously, such a coupling can help reduce the axial load on the first thrust bearing and can also reduce the relative rotational speeds of the inner and outer raceways of both sets of bearings (which can reduce wear).

The fan may be coupled to the drive shaft of the gearbox through a fan catcher shaft, which axially locates the fan, and through a fan shaft component which transmits torque from the gearbox but does not axially locate the fan.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/Utip^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognize cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

Aspects and embodiments of the present disclosure will now be discussed with reference to the accompanying figures. Further aspects and embodiments will be apparent to those skilled in the art.

DETAILED DESCRIPTION OF THE DISCLOSURE

Figure 1:
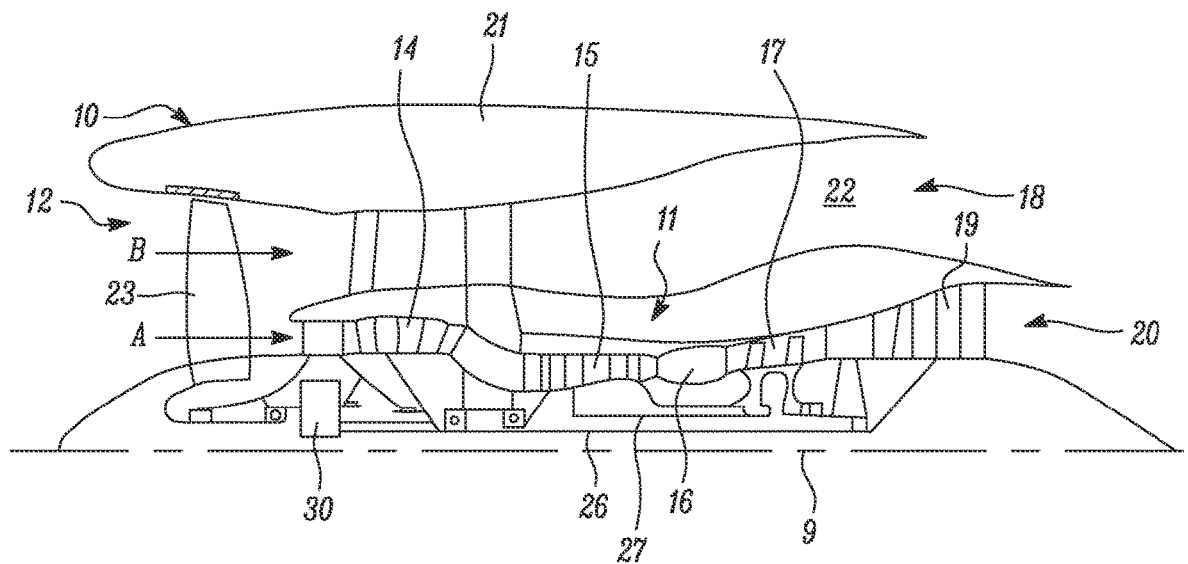
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
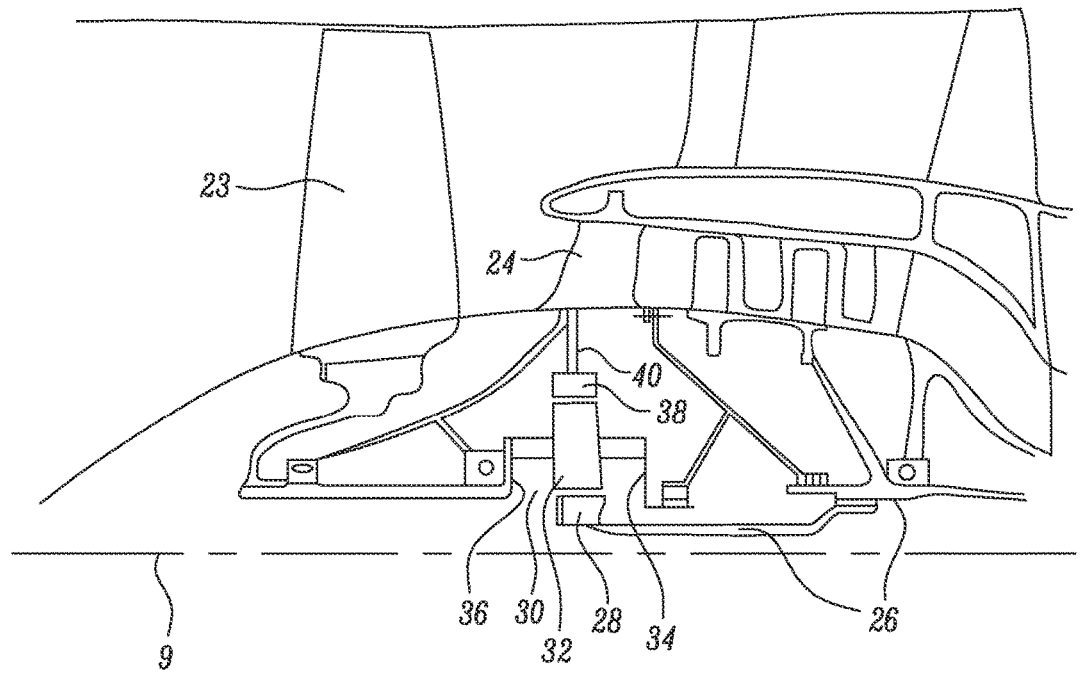
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
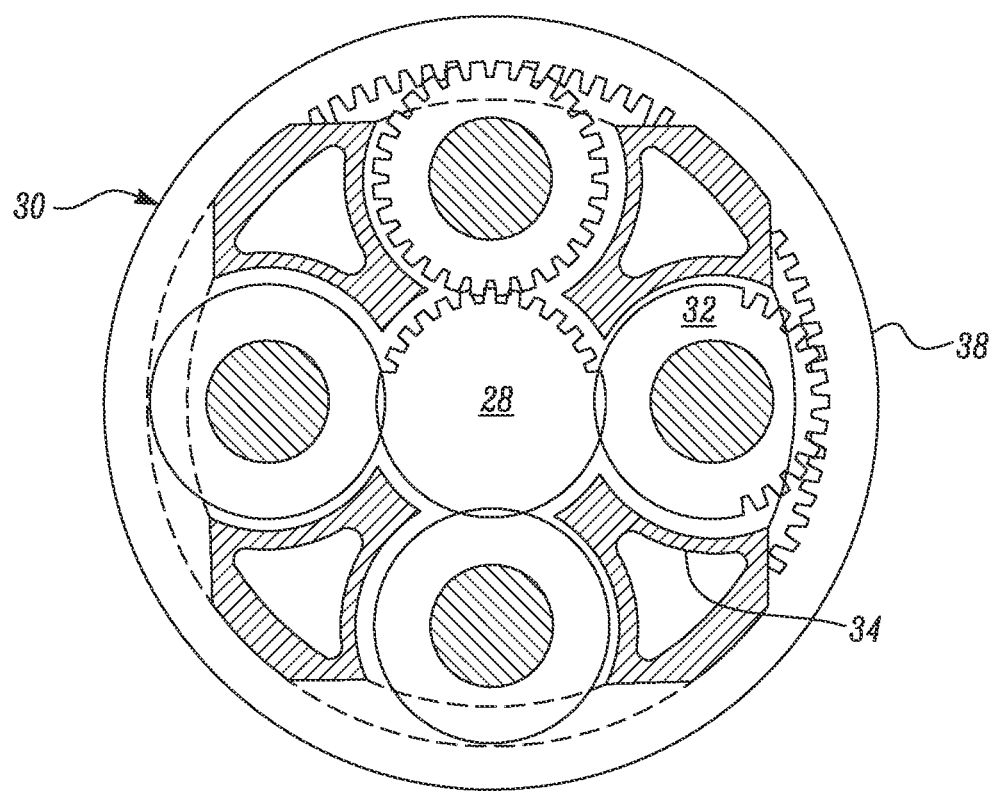
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
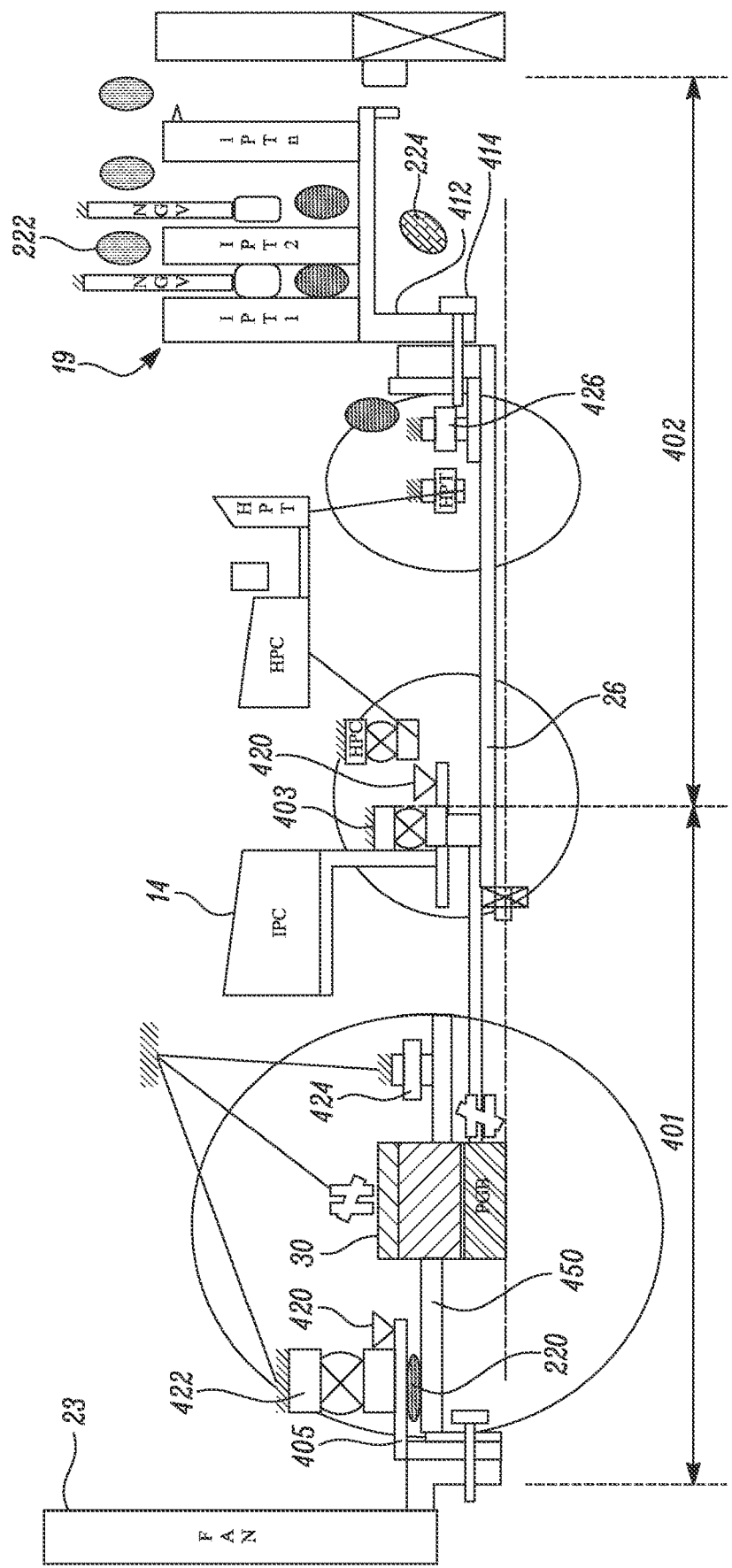
FIG. 4 is a schematic longitudinal cross-sectional view of a gas turbine spool.

FIG. 4 is a schematic longitudinal cross-sectional view of a gas turbine spool 400, and in particular an intermediate pressure (IP) spool to which the present disclosure applies. The spool comprises a fan 23, an IP compressor 14, an IP turbine 19, and their interconnecting shaft system. The shaft system includes core shaft 26, which is mechanically coupled to drive shaft 450 of the gearbox 30. As before, the engine has a configuration in which the fan 12 is driven at a lower rotational speed than the turbine 19 due to being connected via gearbox 30. The IP turbine in this example has several stages, the rotors of which are designated IPT1, IPT2 . . . IPTn.

The shaft system of the IP spool provides a first portion as indicated by arrow 401 and a second portion as indicated by arrow 402. The first portion extends from first thrust bearing 403, located downstream of the IP compressor, to the fan 23. The second portion extends from the first thrust bearing to the IP turbine 19. The dashed regions next to each bearing signify the stationary side of the bearing (e.g. the 'earth' side). The first portion 401 includes a region of the core shaft 26, the drive shaft 450, and a fan shaft component 405. The fan shaft component 405 is connected to the core shaft via drive shaft 450 of gearbox 30, and so turns at a different rotational speed to the core shaft. The second portion 402 includes the core shaft 26 and an IP turbine drive arm 412. The IP turbine drive arm is connected to the core shaft 26 via bolt arrangement 414.

The first portion 401 can be referred to as the 'located failure' region of the shaft system, in that any shaft break in the first portion would not result in the axial movement of any part of the shaft system. This is because any shaft break between thrust bearing 403 and the power gearbox will be axial located. Whereas, the second portion 402 can be referred to the 'unlocated failure' region of the shaft system, in that any shaft break in the second portion would result in a now axially unlocated portion of the shaft system (referred to as the rear portion previously) can move axially rearwards under a gas load.

The first portion 401 is protected by inclusion of rotational speed sensors 420, in this example provide by phonic wheel based sensors. Each phonic wheel based sensor may include a phonic wheel, coupled to a magnetic reluctance sensor which senses when a tooth of the phonic wheel passes in front of it. If the shaft system breaks at any point in the first portion, the rotational speed sensors 420 will detect that a difference in the speeds measured by each sensor 420 exceeds a threshold and can then register this event and prompt countermeasures (e.g. reduction or cut-off of the fuel supply). In some examples, the registration of a shaft break event may be performed by an engine control system which receives readings of rotational speed from the sensors. The second portion 402 is, in this example, protected by clashing or tangling of the turbine elements with static structures located around the turbine (e.g. stator vanes). As discussed previously, this clashing or tangling reduces the terminal speed of the turbine by generating friction.

In the example shown in FIG. 4, there is a further thrust bearing 422 which axially locates the fan shaft component 405. This ensures that, even in the event of a shaft break, the fan 23 is retained within the engine cowling. There is also a roller bearing 424 which radially supports the drive shaft of the gearbox 30. There is also a roller bearing 426 which radially supports the shaft system at a point between the thrust bearing 403 and the IP turbine 19.

Figure 5:
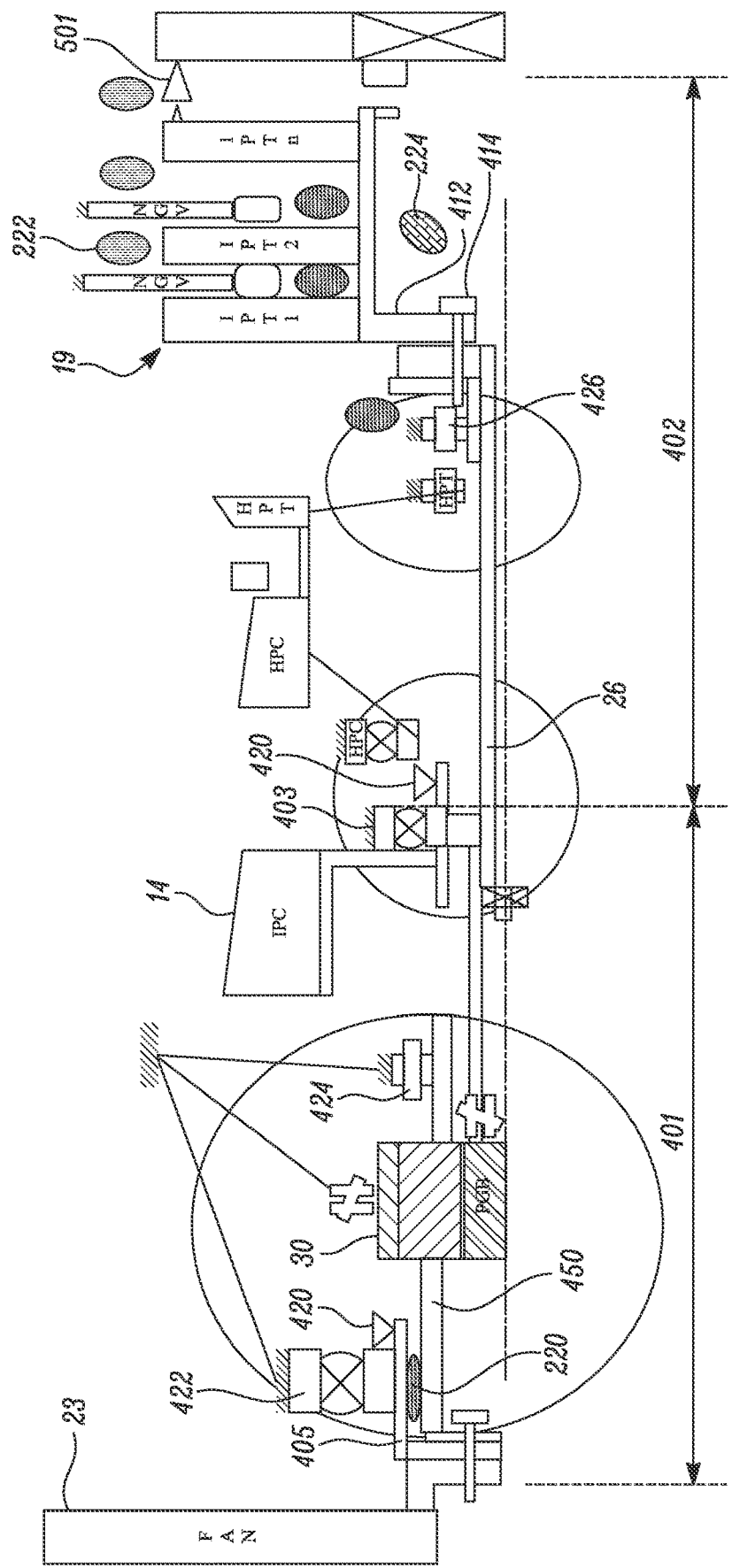
FIG. 5 is a schematic longitudinal cross-sectional view of a variant gas turbine spool.

FIG. 5 shows a schematic longitudinal cross-sectional view of a variant gas turbine spool. Where the gas turbine spool of FIG. 5 shares features with the spool shown in FIG. 4, like features are indicated by like reference numerals.

In contrast to the spool shown in FIG. 4, the spool in FIG. 5 includes a backing sensor 501. The backing sensor is used to detect axial movement of the turbine rotors which is indicative of an unlocated break in the shaft system. The backing sensor in this example is based on electrical conductivity or resistivity of a wire. The wire is enclosed in a brittle material, such as a ceramic, which is shattered when the turbine rotor clashes against it. This shattering causes the wire to change its resistivity or conductivity, and the change in electrical behaviour is used as a detection method for an unlocated shaft failure event.

The backing sensor 501 can be used to protect against shaft failure either in conjunction with the tangling discussed previously, or by itself. Once a shaft failure is detected (by either the backing sensor or phonic wheels 420) action is taken to mitigate this. Preferably, this mitigation includes fuel shut off to the gas turbine engine.

Figure 6:
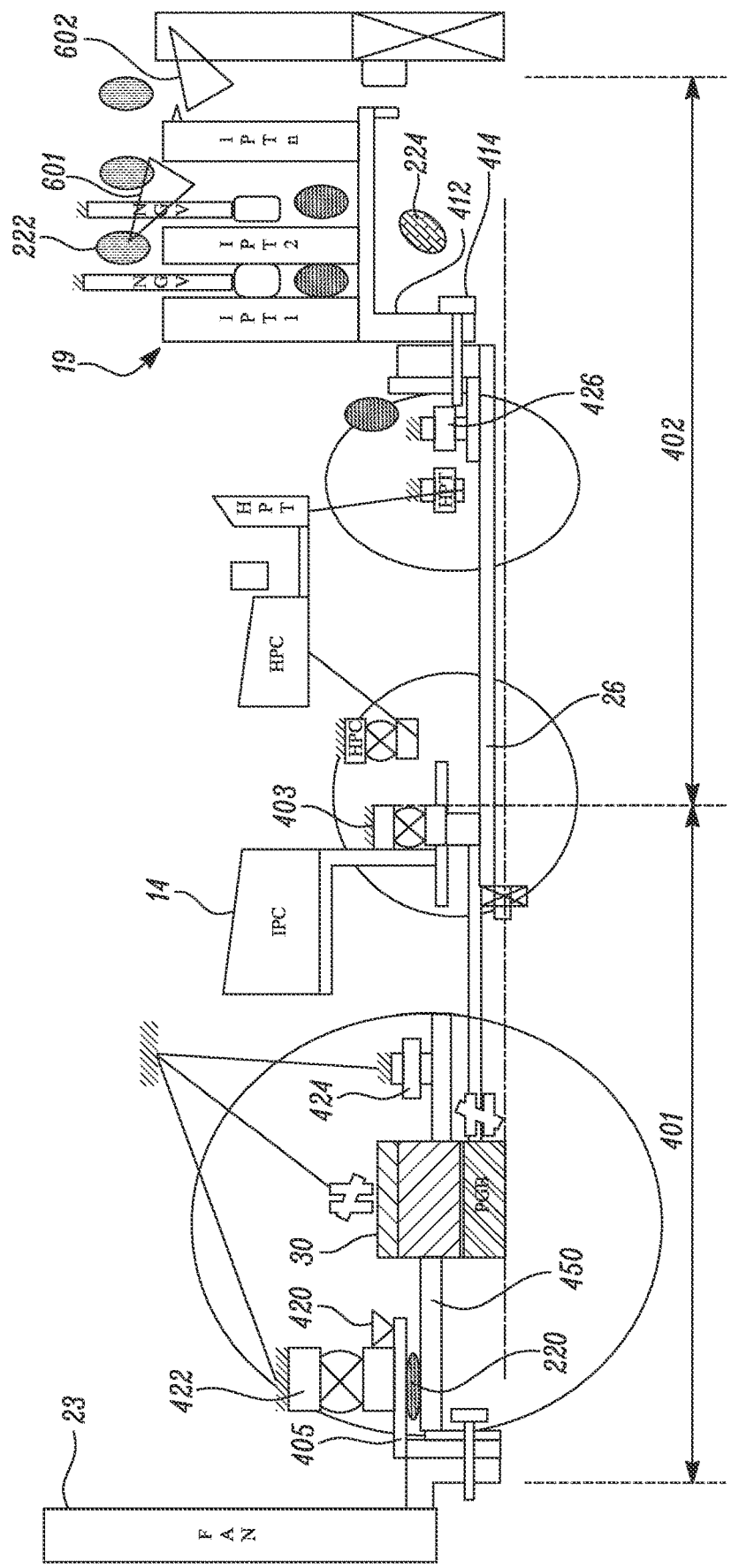
FIG. 6 is a schematic longitudinal cross-sectional view of a variant gas turbine spool.

FIG. 6 shows a schematic longitudinal cross-sectional view of a variant gas turbine spool. Where the gas turbine spool of FIG. 6 shares features with previous spools, like features are indicated by like reference numerals.

In contrast to the spools shown previously, the spool on FIG. 6 includes a microwave sensor in either (or both) of positions 601 or 602. The microwave sensor is a microwave transmission and reception device which uses principles similar to those of sonar or radar. The sensor can be positioned so as to point towards the blades of a turbine stage and, by using sonar principles, can discern the presence of blades as they rotate or pass by the sensor and in this way detect the presence of blades in front of the sensor. The number of blades passing per interval of time can be counted, and so the rotational speed of the turbine stage inferred. This rotational speed can be used, as previously discussed, to register a shaft break if it occurs.

The derivation of the rotational speed of the last turbine stage, IPTn, can be performed by if the microwave sensor is in either position 601 or 602. However, preferably, the microwave sensor is located in position 601 so that it is not within the core gas flow path, and so contamination risks are minimized. As the sensor, in either position, senses the rotational speed of the last turbine stage, this allows the entire shaft system to be protected in the event of a shaft break. Also of note, is that the second phonic wheel (previously located near the IPC) can be removed.

In a variant of FIG. 6, the microwave sensor utilizes sonar principles and the Doppler Effect to detect axial displacement of one of the turbine stages. This allows the microwave sensor to function in the same manner as the backing sensor discussed previously, and indeed may be an example of a backing sensor.

Figure 7:
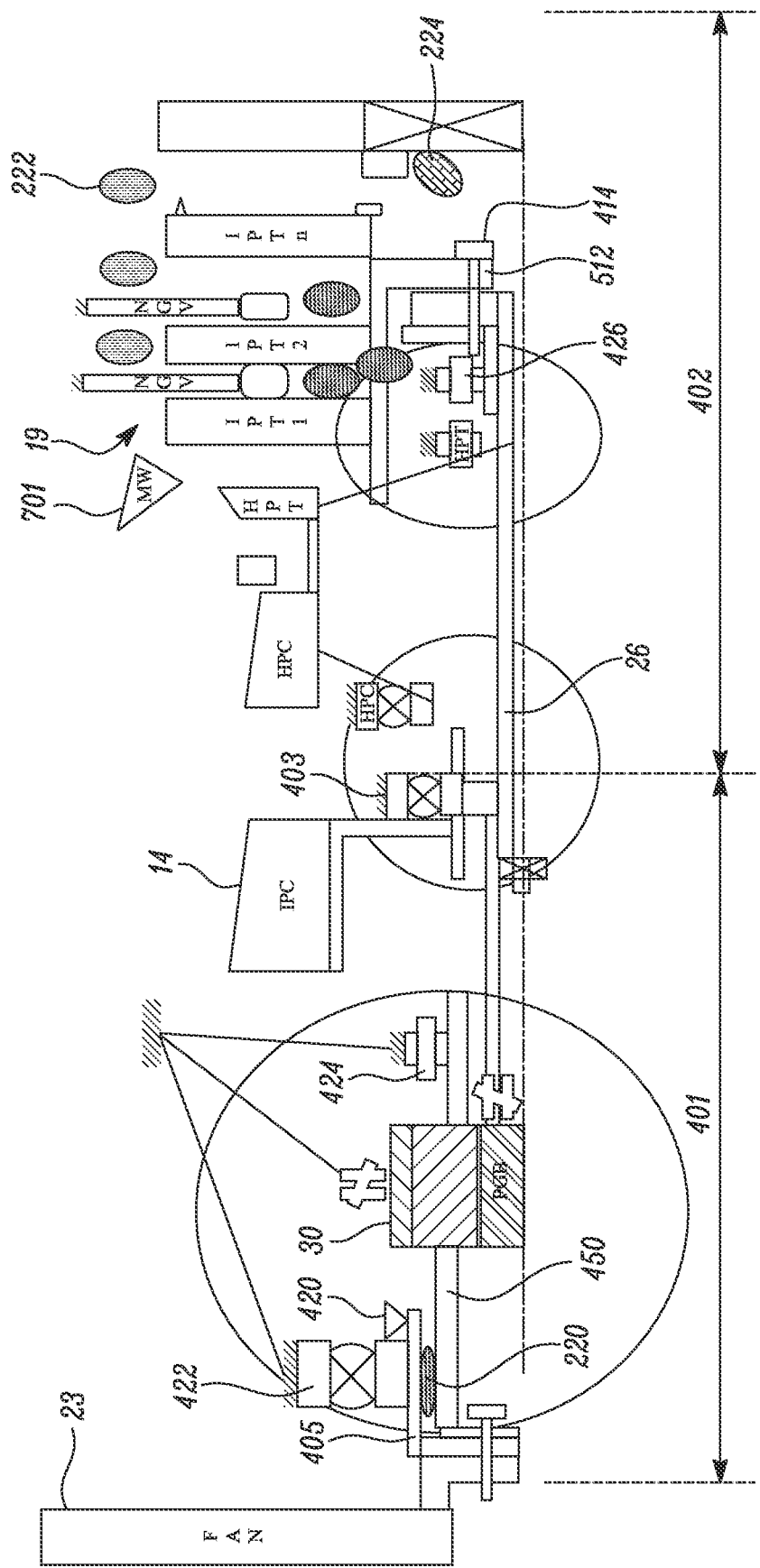
FIG. 7 is a schematic longitudinal cross-sectional view of a variant gas turbine spool.

FIG. 7 shows a schematic longitudinal cross-sectional view of a variant gas turbine spool. Where the gas turbine spool of FIG. 7 shares features with previous spools, like features are indicated by like reference numerals.

In contrast the spool shown previously, the spool in FIG. 7 provides a single microwave sensor 701 which is directed at the first IPT stage i.e. the one closest to the IPC. In addition to this microwave sensor, the IPT is driven from the last stage as a variant IP turbine drive arm 512 is used which connects at one end to the core shaft 26 and at an opposing end to the first IPT stage (IPT1), with the other turbine stages being connected at points between these ends. By arranging the microwave sensor 701 and IPT stage according to FIG. 7, complete protection of the torque path in the event of shaft failure can be achieved. Again, in the configuration shown in FIG. 7, the second phonic wheel can be omitted.

Figure 8:
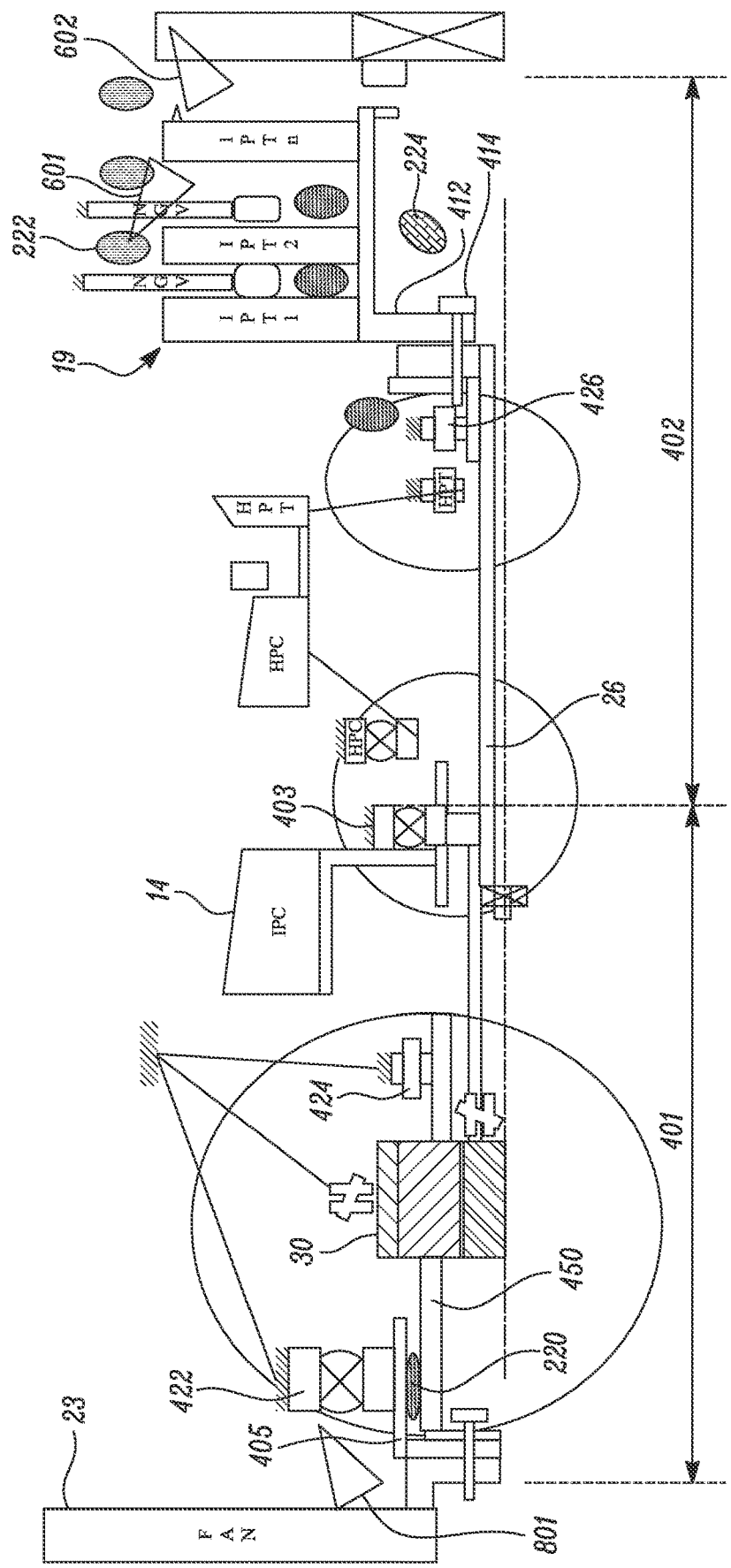
FIG. 8 is a schematic longitudinal cross-sectional view of a variant gas turbine spool.

FIG. 8 shows a schematic longitudinal cross-sectional view of a variant gas turbine spool. Where the gas turbine spool of FIG. 8 shares features with previous spools, like features are indicated by like reference numerals.

In addition to the microwave sensor in one, or both, of positions 601 and 601 as per FIG. 6, the spool of FIG. 8 also includes a second microwave sensor 801 which measures the fan 23 rotational speed. The other microwave sensor(s), as before, measures the rotational speed of the turbine stage which is furthest from the connection between IP turbine drive arm 412 and the core shaft 26. The entire torque path is, again, protected in the event of shaft failure. In this example, both phonic wheels referred to previously can be omitted.

Figure 9:
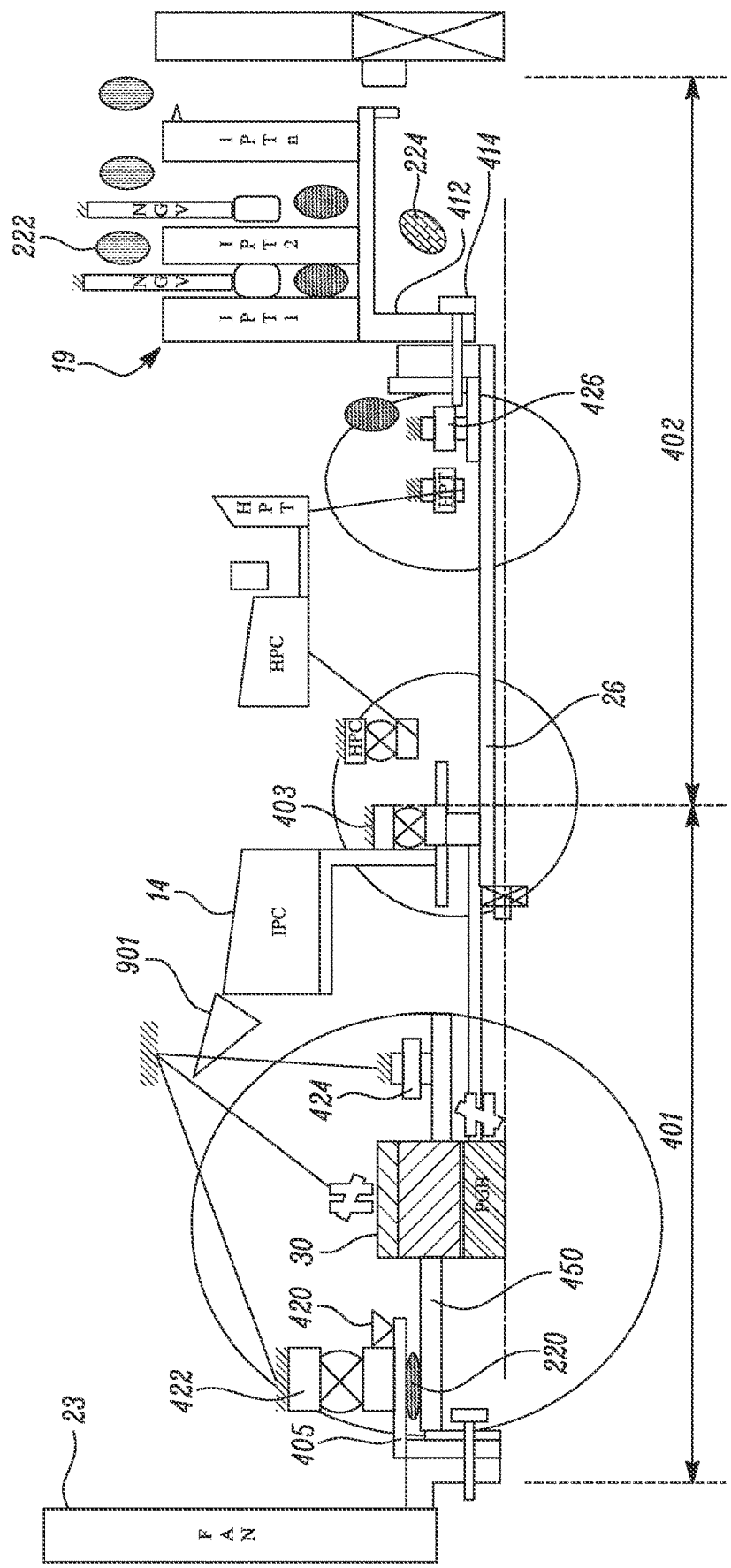
FIG. 9 is a schematic longitudinal cross-sectional view of a variant gas turbine spool.

FIG. 9 shows a schematic longitudinal cross-sectional view of a variant gas turbine spool. Where the gas turbine spool of FIG. 9 shares features with previous spools, like features are indicated by like reference numerals.

The spool shown in FIG. 9 includes a phonic wheel 420, as before, which measures the rotational speed of the fan shaft component 405. It does not, however, include a phonic wheel located next to the compressor. Instead, microwave sensor 901 is positioned to measure the rotational speed of the first row of blades in the compressor (the ones located furthest from thrust bearing 403). This configuration protects the entire first, axially located, portion 401 of the shaft system including the compressor interstage drive arms. Whilst not shown, in a further variant to FIG. 9, phonic wheel 420 can be replaced by a microwave sensor in the same manner as discussed in relation to FIG. 8. Whilst the turbine drive arm 412 in FIG. 9 matches those in FIGS. 4-6 and 8, it may be replaced with the variant turbine drive arm 512 described in FIG. 7.

Figure 10:
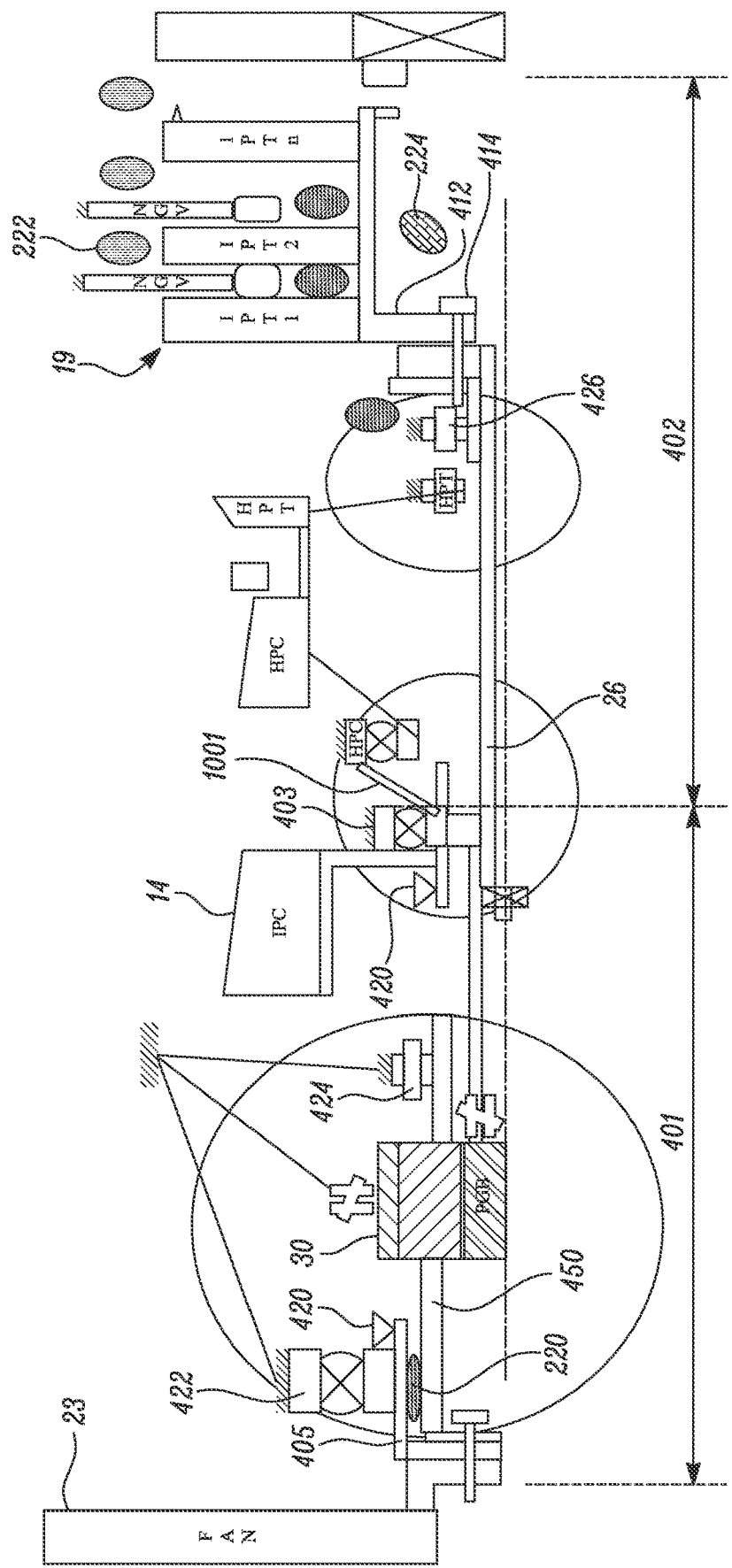
FIG. 10 is a schematic longitudinal cross-sectional view of a variant gas turbine spool.

FIG. 10 shows a schematic longitudinal cross-sectional view of a variant gas turbine spool. Where the gas turbine spool of FIG. 10 shares features with previous spools, like features are indicated by like reference numerals. The spool in FIG. 10 differs from that shown in FIG. 4, in that thrust bearings 1002 of the high pressure compressor (HPC) are coupled to the thrust bearings 403 of the IPC. This coupling reduces the axial load incurred from the backwards pull of the IP turbine. The HP spool has a resultant forward pull that will be compensated with the backward pull from the IPT.

The bearing coupling also brings a benefit in that there is a lower relative speed between the raceways of the thrust bearings as compared to examples where the one raceway is essentially stationary, as the HP and IP spools are rotating at different speeds but in the same direction. In some examples, to couple the thrust bearings the radially inner raceway of the IP spool thrust bearing 403 is mechanically coupled by linkage 1001 to the radially outer raceway of the HPC thrust bearing 1002 so that the two are rotationally locked and rotate at the same rate. In other examples, the thrust bearings are coupled by slightly permutating the linkages between raceways. In yet other examples, the inner raceway of the IPC bearing is coupled to the inner raceway of HPC bearing and the outer raceway of the HPC bearing will couple to the HP compressor.

With this arrangement, as shown in FIG. 10, the second phonic wheel 420 is moved to a forward stubshaft out of the thrust bearing 403. This arrangement ensures that all located shaft failures on the IPC remains part of the first portion 401 of the shaft system.

Figure 11:
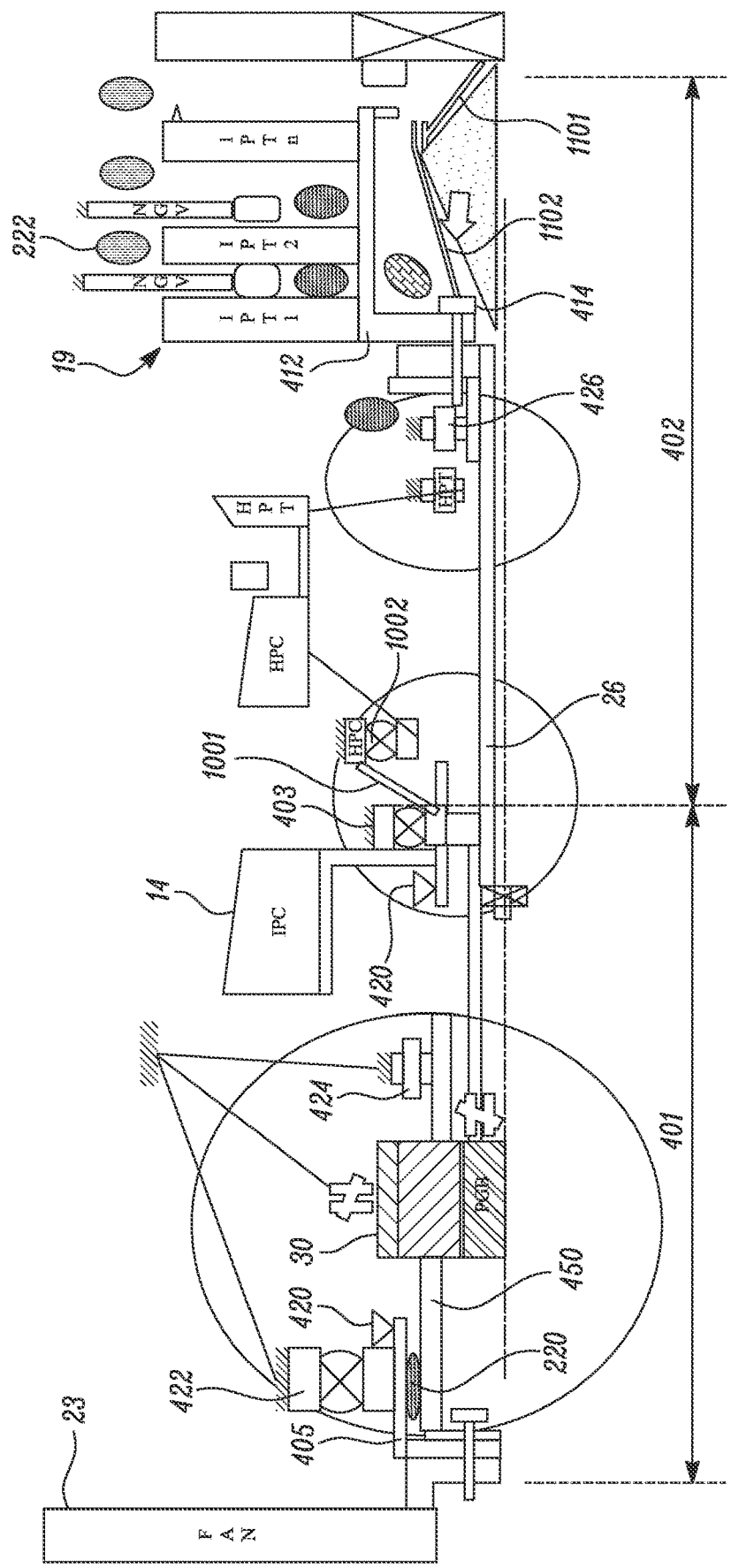
FIG. 11 is a schematic longitudinal cross-sectional view of a variant gas turbine spool.

FIG. 11 shows a schematic longitudinal cross-sectional view of a variant gas turbine spool. Where the gas turbine spool of FIG. 11 shares features previous spools, like features are indicated by like reference numerals. The spool in FIG. 11 differs from that in FIG. 10 in that it includes a seal segment managing system. This system uses secondary air system (SAS) to pressurize a sealed cavity 1101. The cavity has a relatively large diameter seal, where one face is attached to the IP spool and the other face is anchored to a static element of the engine. This creases a piston effect, with a resultant axially forward force 1102 that counters the backwards pull force of the IPT on the thrust bearing 403. The system in FIG. 11 can be used in addition to the bearing coupling discussed with relation to FIG. 10, or instead of the bearing coupling.

Figure 12:
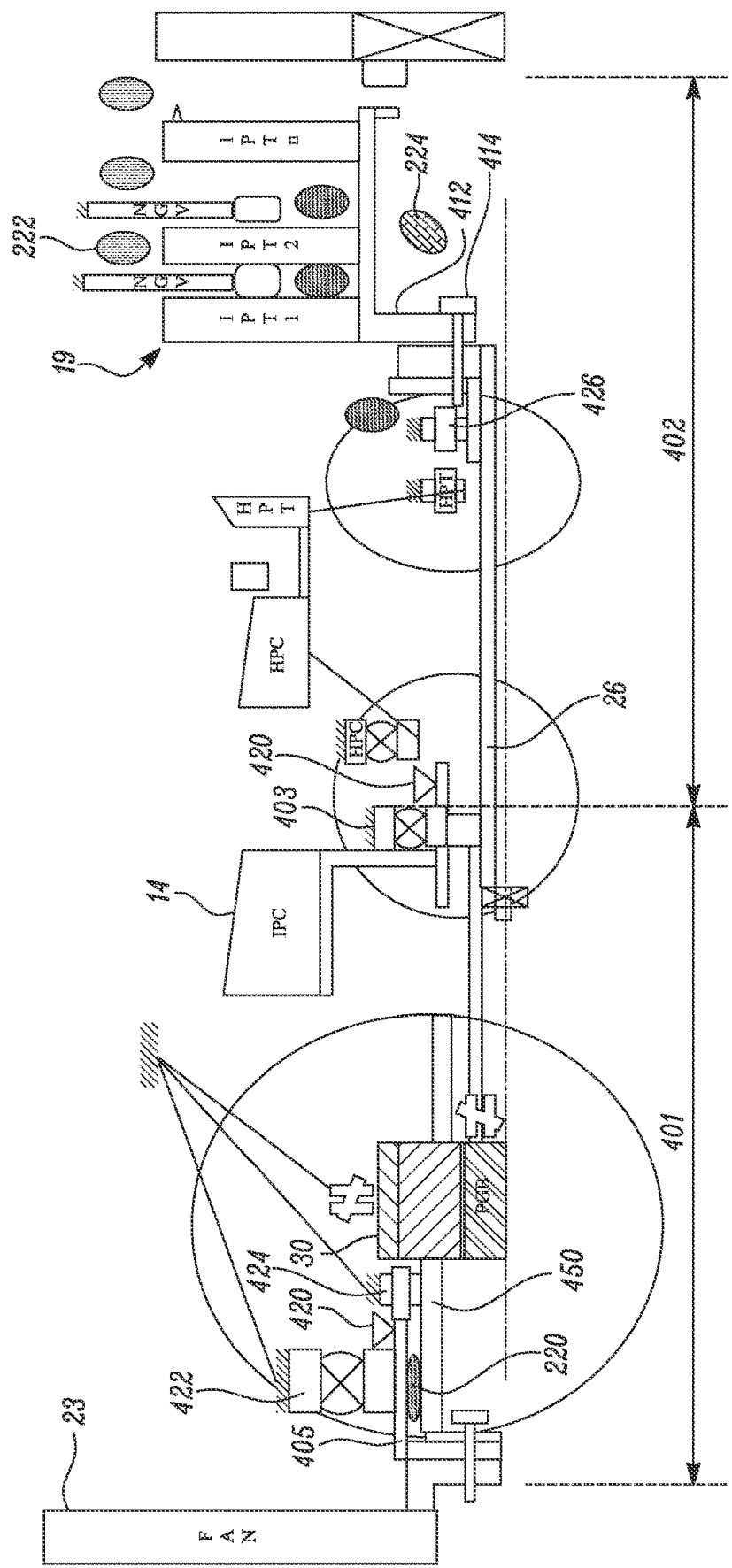
FIG. 12 is a schematic longitudinal cross-sectional view of a variant gas turbine spool.

FIG. 12 shows a schematic longitudinal cross-sectional view of a variant gas turbine spool. Where the gas turbine spool of FIG. 12 shares features previous spools, like features are indicated by like reference numerals. The spool in FIG. 12 differs from that in FIG. 4 in that the roller bearing, supporting the drive shaft 450, is located between the gearbox 30 and the fan 23, instead of between the gearbox 30 and the IPC 14. Positioning the bearing so allows the planetary carrier of the gearbox to be isolated from any radial reactions.

Figure 13:
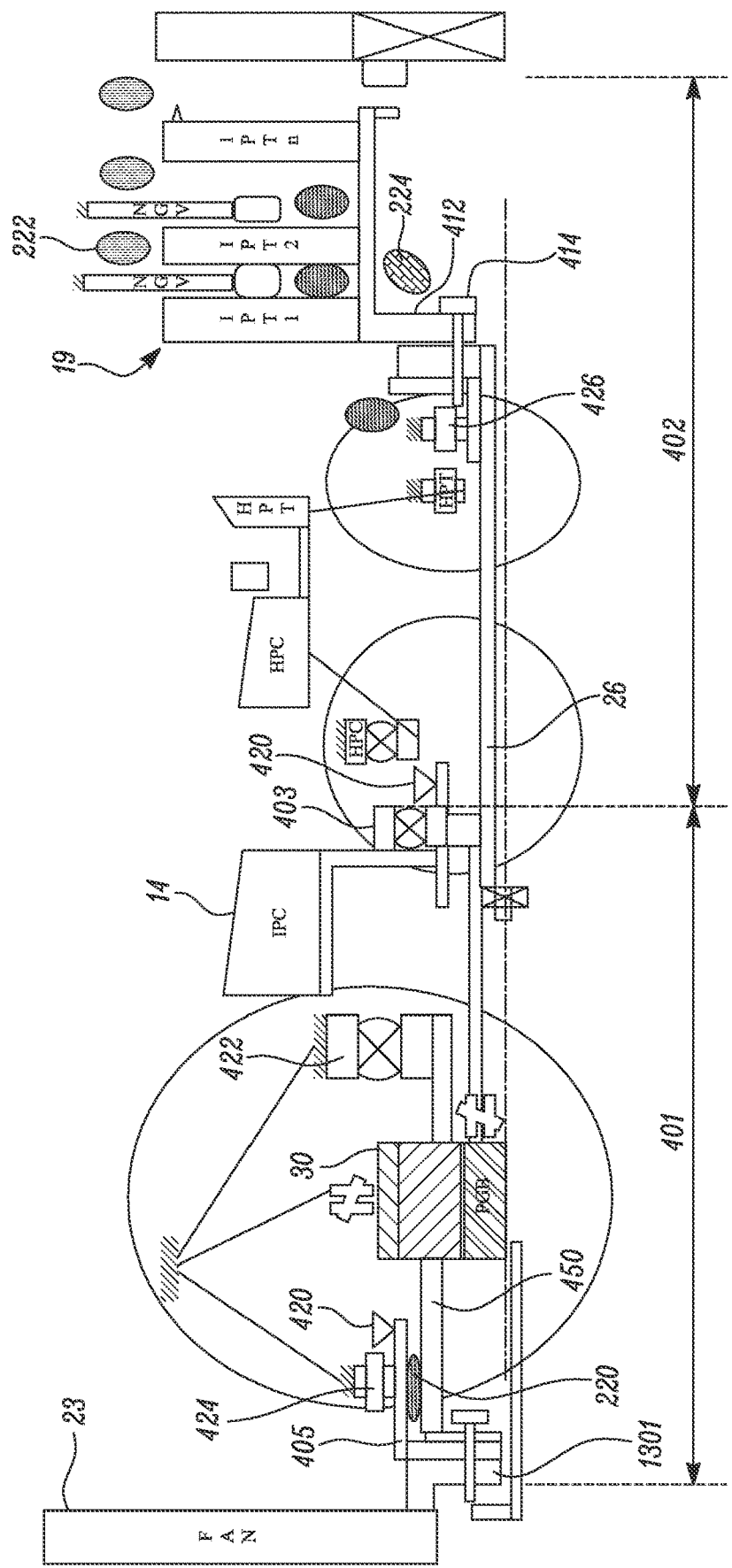
FIG. 13 is a schematic longitudinal cross-sectional view of a variant gas turbine spool.

FIG. 13 shows a schematic longitudinal cross-sectional view of a variant gas turbine spool. Where the gas turbine spool of FIG. 13 shares features previous spools, like features are indicated by like reference numerals. The spool shown in FIG. 13 differs from those shown previously, in that thrust bearing 422, adjacent to the fan, and roller bearing 424, adjacent to the drive shaft 450 of gearbox 30 have been swapped. Therefore the fan shaft component 405 is only radially supported by its bearing, and the drive shaft 450 of the gearbox is radially and axially supported by thrust bearing 442. Fan retention is achieved due to the fan being secured to the input shaft of the gearbox via fan catcher shaft 1301, and the drive shaft being axially located by thrust bearing 422.

Figure 14:
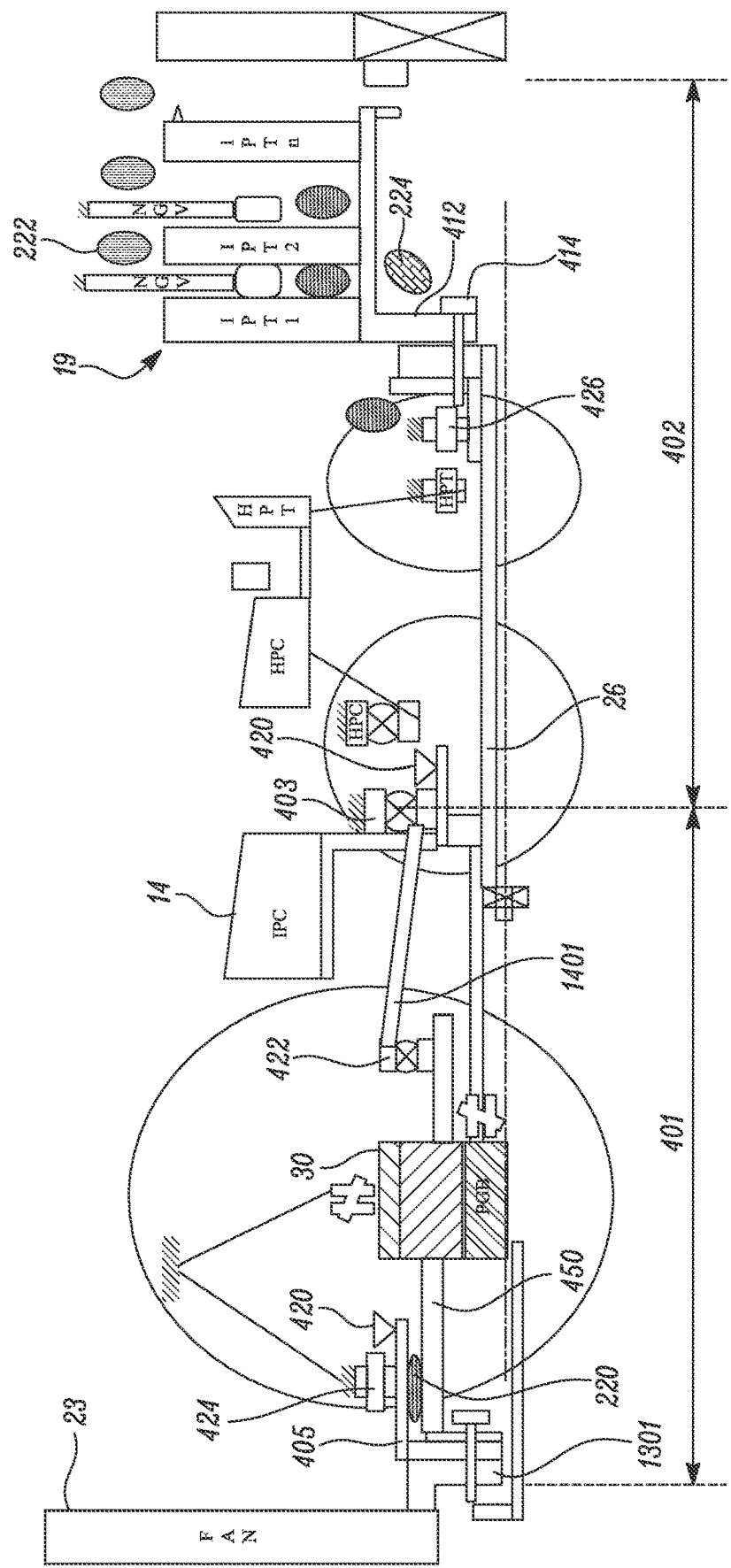
FIG. 14 is a schematic longitudinal cross-sectional view of a variant gas turbine spool.

FIG. 14 shows a schematic longitudinal cross-sectional view of a variant gas turbine spool. Where the gas turbine spool of FIG. 14 shares features previous spools, like features are indicated by like reference numerals. FIG. 14 differs from FIG. 13, in that thrust bearing 422 is coupled with thrust bearing 403 via mechanical linkage 1401. As mentioned before with relation to FIG. 10, by coupling the raceways of the thrust bearings together, the axial load can be reduced as can the relative rotational speeds.

Figure 15:
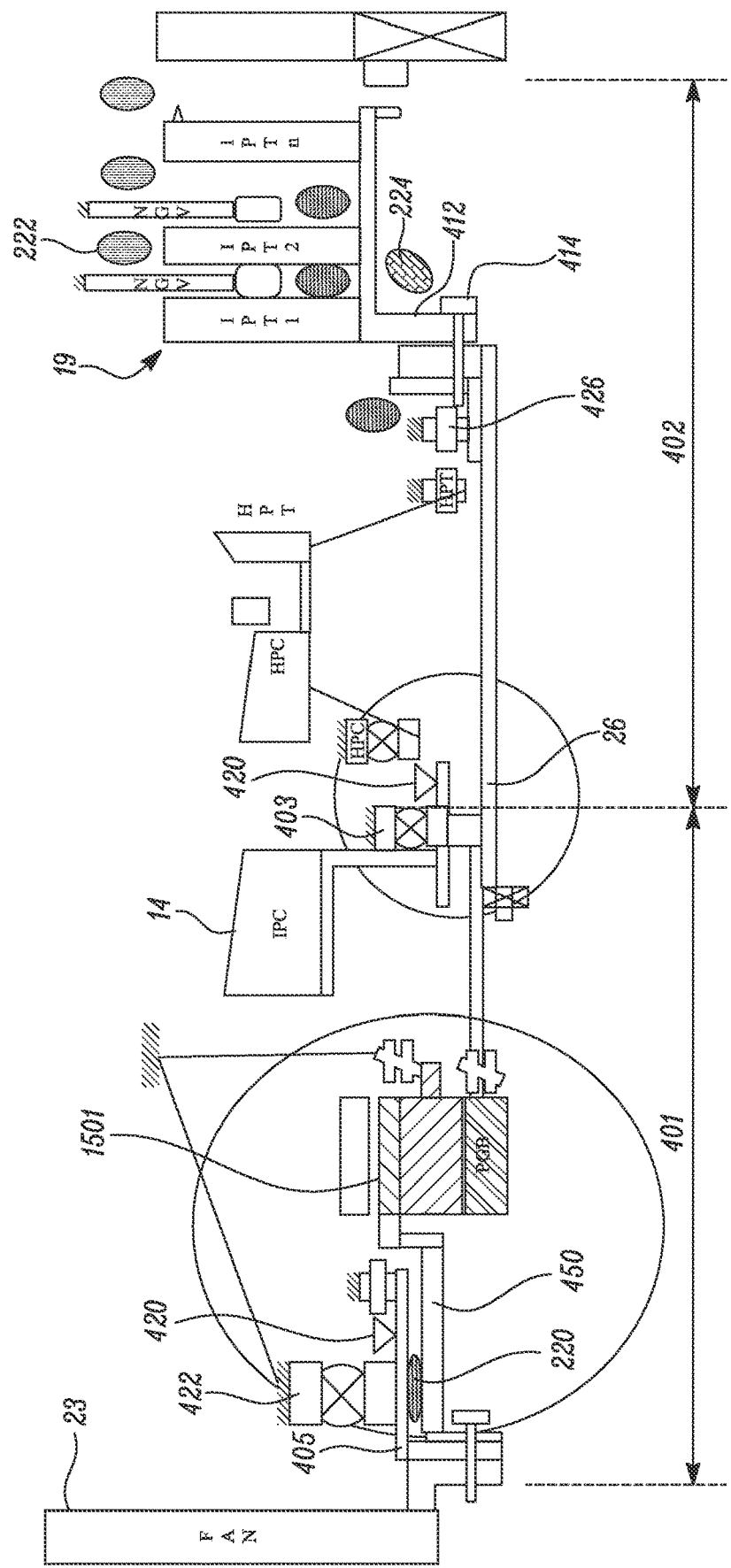
FIG. 15 is a schematic longitudinal cross-sectional view of a variant gas turbine spool.

FIG. 15 shows a schematic longitudinal cross-sectional view of a variant gas turbine spool. Where the gas turbine spool of FIG. 15 shares features previous spools, like features are indicated by like reference numerals. The spool in FIG. 15 differs from that shown in FIG. 4, in that the gearbox is provided as a STAR configuration gearbox 1501. The STAR configuration gearbox has a carrier of planets which fixed (as opposed to free to move, in previous examples), and the ring gear rotates and transmits torque to the fan assembly. The gearbox also includes a containment casing for the gearbox ring gear. Whilst not shown, the example shown in FIG. 15 may adopt any of the bearing and/or sensor configurations discussed in relation to any of FIGS. 4-9.

In the figures, the marker 220 represents areas of sealing and static structures, which should typically allow for free backward movement. Marker 224 represents air system cavities, which typically are not allowed to become semi-sealed. Marker 222 represents components with an associated loss of performance due to increased tip clearance caused by backward movement.

Also in the figures, a circle drawn around set of bearings and/or the gearbox 30 indicates that the bearings and/or gears within this circle reside within the same bearing chamber. This means they may be provided with oil by the same lubrication system or subsystem.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft comprising:
   an engine core comprising a turbine, a compressor, a fan located upstream of the compressor and comprising a plurality of fan blades, and a core shaft connecting the turbine to the compressor; and a gearbox which receives an input from the core shaft and outputs drive, via a drive shaft, to the fan so as to drive the fan at a lower rotational speed than the turbine, the drive shaft and the core shaft forming a shaft system, wherein the shaft system provides:
- a first portion which extends forward from a first thrust bearing to the fan, the first thrust bearing supporting the shaft system and being located between the turbine and the gearbox, and
- a second portion extending rearward from the first thrust bearing to the turbine, such that in the event of a shaft break within the second portion of the shaft system, said shaft break dividing the shaft system into a front portion axially located by the first thrust bearing and a rear portion no longer axially located by the first thrust bearing, the rear portion is free to move axially rearwardly under a gas load;

wherein the engine further comprises a shaft break detector, configured to detect the shaft break in the shaft system, wherein the shaft break detector includes a phonic wheel, located at the first portion of the shaft system, and a microwave sensor, configured to sense a rotational speed of the shaft system at the second portion of the shaft system axially spaced from the first portion, and wherein the turbine has a plurality of stages, the microwave sensor being provided at a first stage of the plurality of stages that is closest to the compressor and the core shaft being connected to the turbine at a final stage of the plurality of stages.

2. The gas turbine engine as claimed in claim 1, wherein the core shaft is supported by one or more non-thrust bearings located rearwards of the first thrust bearing.

3. The gas turbine engine as claimed in claim 1, wherein the first thrust bearing is located such that the pathway for torque transmission from the turbine to the compressor includes the first portion of the shaft system.

4. The gas turbine engine as claimed in claim 1, wherein the drive shaft is supported forward of the first thrust bearing by one or more further thrust bearings.

5. The gas turbine engine as claimed in claim 1, further comprising a roller bearing supporting the drive shaft.

6. The gas turbine engine as claimed in claim 1, wherein the shaft break detector is configured to register the shaft break when it detects a twist exceeding a predetermined threshold between two points in the first portion of the shaft system.

7. The gas turbine engine as claimed in claim 1, wherein:
- the turbine is a first turbine, the compressor is a first compressor, and the core shaft is a first core shaft;
- the engine core further comprises a second turbine, a second compressor, and a second core shaft connecting the second turbine to the second compressor;
- the second turbine, the second compressor, and the second core shaft are arranged to rotate at a higher rotational speed than the first core shaft; and
- wherein the second core shaft is axially located by one or more respective second thrust bearings.

* * * * *